Oct. 13, 1959 E. H. GATZERT ET AL 2,908,765

CONCENTRATOR FOR TELEPHONE ANSWERING SERVICE

Filed April 10, 1958 4 Sheets-Sheet 1

INVENTOR
E. H. GATZERT
W. W. PHARIS
BY Francis E. Blake
ATTORNEY

Oct. 13, 1959 E. H. GATZERT ET AL 2,908,765

CONCENTRATOR FOR TELEPHONE ANSWERING SERVICE

Filed April 10, 1958 4 Sheets-Sheet 2

United States Patent Office 2,908,765
Patented Oct. 13, 1959

2,908,765

CONCENTRATOR FOR TELEPHONE ANSWERING SERVICE

Ernest H. Gatzert and William W. Pharis, Rochester, N.Y., assignors to General Dynamics Corporation, Rochester, N.Y., a corporation of Delaware Application April 10, 1958, Serial No. 727,738

5 Claims. (Cl. 179—27)

This invention relates to telecommunication switching systems and particularly to means for interconnecting a line and its normally separated distant termination upon the seizure of such line.

An object of the invention is to provide circuitry whereby two step-by-step switches terminating a line may by mutual control both advance concurrently, maintaining strict one to one correspondence between the bank terminals which both traverse.

The invention resides in the circuitry of a related pair of switches at the distant ends of a communication channel, one of which acts as a line finder to connect the said channel to a calling line and the other to connect the said channel to a corresponding line termination at said distant end. Thus a plurality of lines, each having a termination at a distant point normally disconnected therefrom, may be effectively extended each to its individual termination. Such two switches are in a mutual control circuit whereby when one makes a step in either its primary or its secondary direction, it will not make another step until the other switch has made a similar step. Thus as the line finder at one end of the trunk moves to seek out the calling line the switch at the other end takes a corresponding number of steps so that the movements of the two switches are rendered precisely alike. In this way a calling line may be extended to its own termination, and in this way the appearance of a call on any one of said distant terminations positively identifies the line to which a call has been extended.

One system which may employ the present invention is the so-called line answering service wherein connections to the lines of subscribers to such a service enter switching facilities where an attendant is always on duty and who will answer calls extended to such lines in the absence of the subscriber. Since such business establishments are not physically located in the telephone plant this means that a line for each telephone station to be served must be extended to the private location of the answering service bureau and it needs no argument to establish the wastefulness of such an arrangement. Accordingly, the present invention provides means for concentrating the incoming calls to subscribers to this service over a small number of lines, by way of example, five to seven trunks per hundred lines. Thus every such line has its answering bureau termination normally severed therefrom but when a call comes in, the line and its termination will be interconnected by one of a lesser number of trunks.

A feature of the invention is a pair of switches, the brushes of which are interconnected over a communication channel and having lines terminating in the bank terminals of one and extension of said lines in one to one correspondence therewith terminating in the bank terminals of the other.

Thus only when a line has been connected to its individual and distant termination may a connection be made thereto at the answering bureau thereby affording privacy whereby an operator at the answering bureau may not listen in excepting only when her services have been demanded.

Another feature of the invention is a mutually controlled stepping arrangement for the two switches located at either end of the communication channel whereby after one switch has advanced one step it will not make another such step until the other switch has completed a similar and corresponding step. In accordance with this feature a conventional differential duplex circuit is employed for communication between the two switches.

Other features will appear hereinafter.

The drawings consist of four sheets having five figures, as follows.

Figures 1, 2:
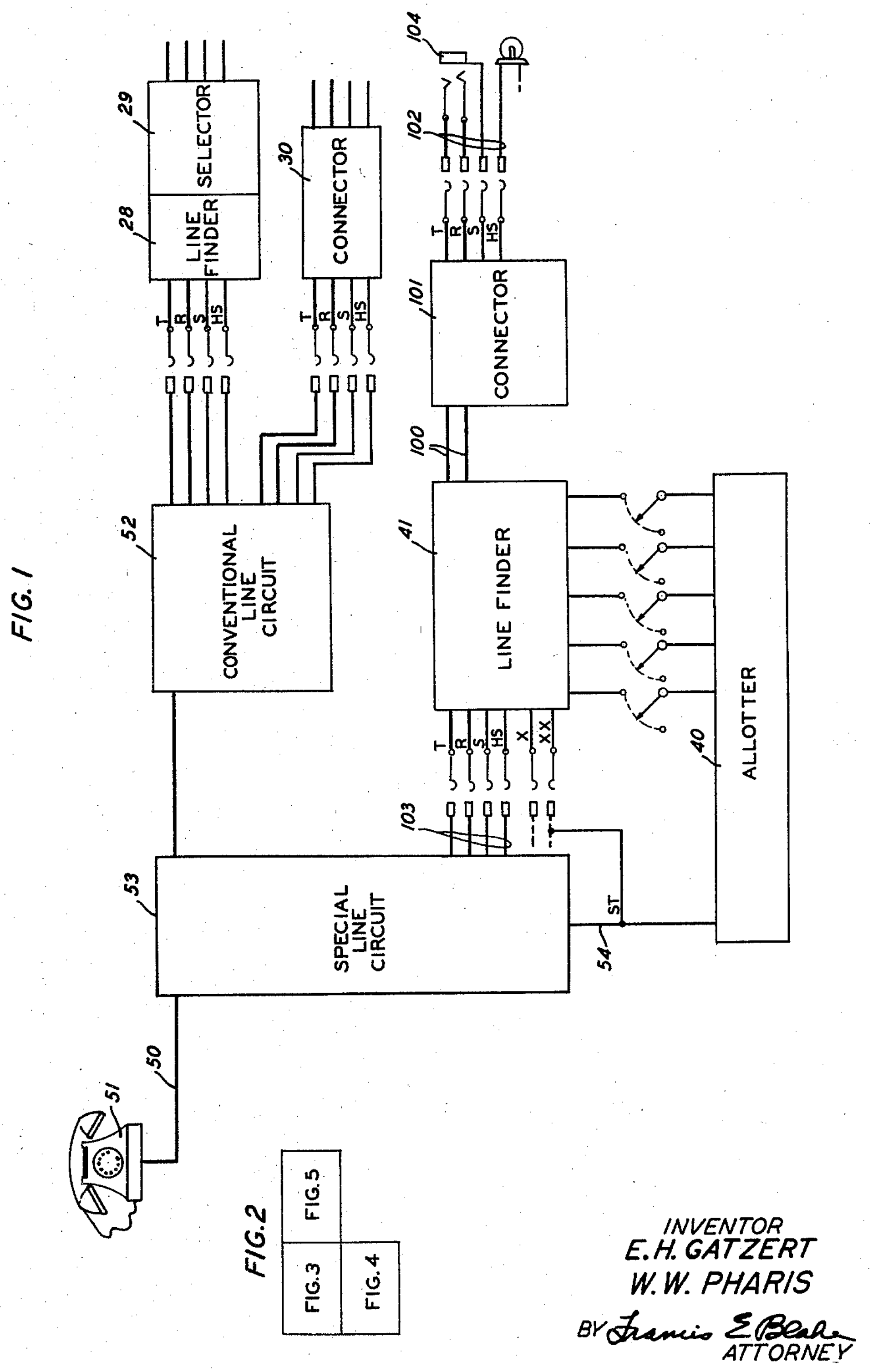
Fig. 1 is a block diagram showing certain circuits used in a telephone system and indicating the manner in which the circuits of the present invention are employed.
Fig. 2 is a block diagram showing how the circuits of Figures 3, 4 and 5 may be placed to form a complete schematic circuit diagram of the concentrator trunk circuit for interconnecting the line terminations with their individual distant answering bureau terminations.

Looking first at Fig. 1 it is to be noted that with the exception of the circuit details of the allotter 40 and the line finder 41 as well as the circuitry of the line 100 from this line finder to the answering service bureau, the connector 101 thereat and the line termination 102 individual to the line finder termination 103, this system is disclosed in detail in the copending application, Serial Number 657,681, filed May 7, 1957. In accordance therewith a line 50 leading to a station 51 provided with a conventional line circuit 52 for handling incoming calls from the connector 30 and outgoing calls over the line finder 28 and selector 29 may also be provided with an adapter circuit herein shown as a special line circuit 53. When and if an incoming call to the station 51 remains unanswered for a given predetermined period the special line circuit 53 will enable the allotter start circuit, whereby the line finder 41 will operate to pick up this line 103 and to extend it to its individual termination 102 at the answering service bureau.

This system is characterized by the fact that each line termination 103 has a distant termination 102 in one to one correspondence therewith and that the switching is entirely one way so that an operator making connection through the jack 104 can only do so when and if the termination 102 is enabled because of an unanswered call condition appearing on the termination 103. Such an operator cannot make connection to the line 50 when it is not in use nor when it is in normal use but only when her services are demanded.

*Detailed operation*

In the following description only so much of the allotter circuit as is necessary to an understanding of the present invention is shown. The switch employed is a step-by-step switch arranged to move its four brushes first in an X or primary direction to select a group of terminals and thereafter in a Y or secondary direction to select a particular set of terminals in the selected group. The switch also has a pair of brushes known as the X and XX brushes which move only during the X movement of the switch and which select terminals corresponding to the number of steps taken by the switch in the X direction.

It has been shown heretofore that when a call is extended to a subscriber's telephone, that if he fails to answer within a given time a ground will be placed on the start wire 54 of the allotter. This is shown in the present Fig. 3 as the wire BST. It may be noted that in the present showing only one of a pair of allotters conventionally employed is shown and the BST wire is employed for starting this one (the AST wire being used to start the other). The BST wire is also connected to one of the terminals traversed by the XX brush to mark the primary group in which the calling line is contained. In like manner, the AST wires will be connected to terminals traversed by the X wiper. The grounding of the BST wire will start the operation of the allotted line finder.

For purposes of description it will be assumed that the calling line is number 21, that is, it is in the second group of lines reached in the primary direction and is the first line reached in that group in the secondary direction.

When the BST wire is grounded a circuit will be established from such ground through the resistor 301, conductor 401, the normally operated armature and front contact of the FB relay 402 and the winding of the SA relay 403. The SA relay operates and closes a circuit from ground, an armature and back contact of the YS relay 404, an armature and front contact of the SA relay 403, the winding of the GD relay 405, a front contact and armature of the FB relay 402, a back contact and armature of the XS relay 406, through the interrupter springs and winding of the allotter switch magnet 302 to battery. The GD relay will operate in this circuit but the RX magnet 302 will not. It takes a direct ground such as the Z contact 303 ground to render the RX magnet effective in this circuit.

Figure 3:
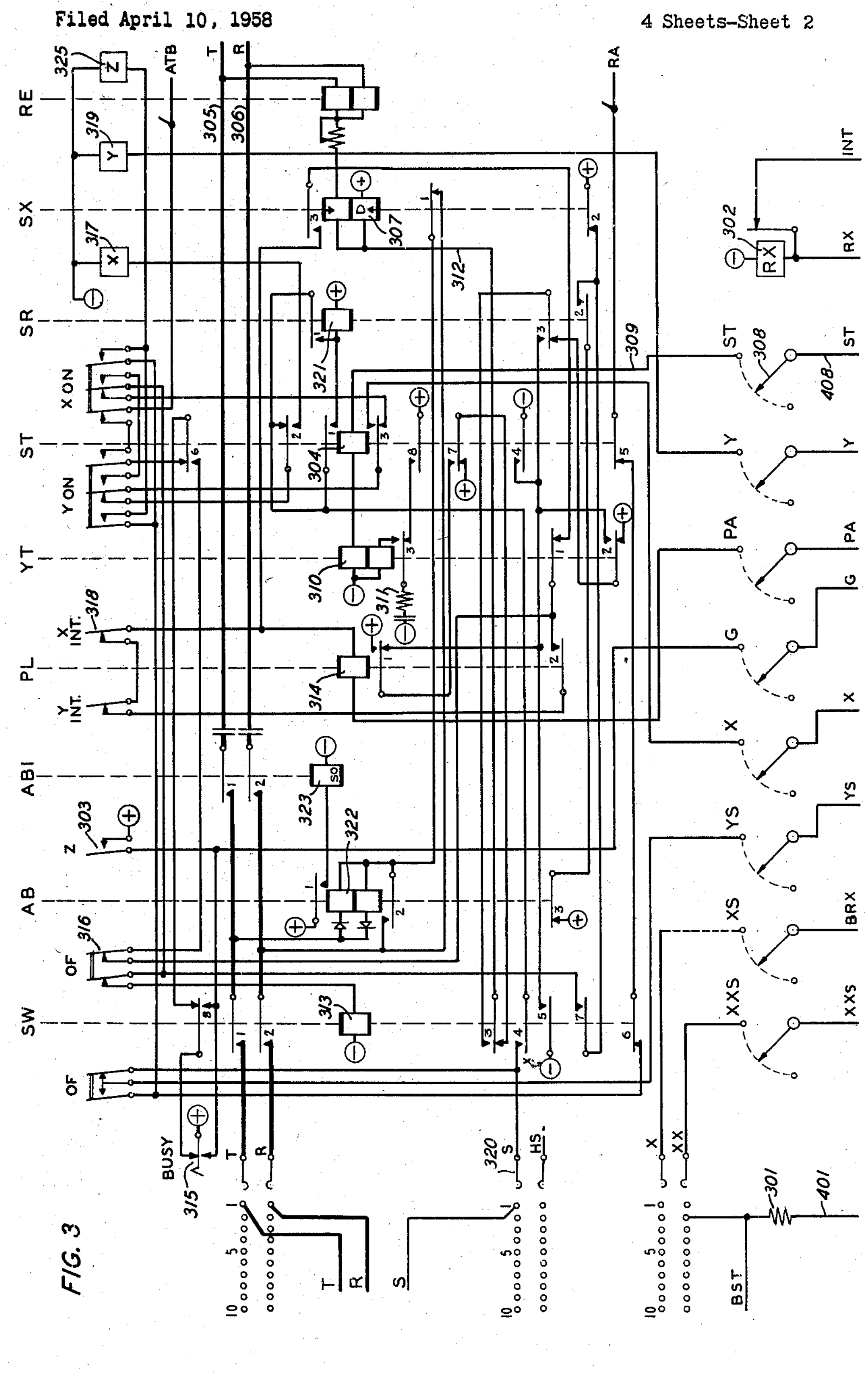
Fig. 3 is a schematic circuit diagram of the circuitry of the line finder used to make connection to a line on which there is an unanswered call.
Figure 4:
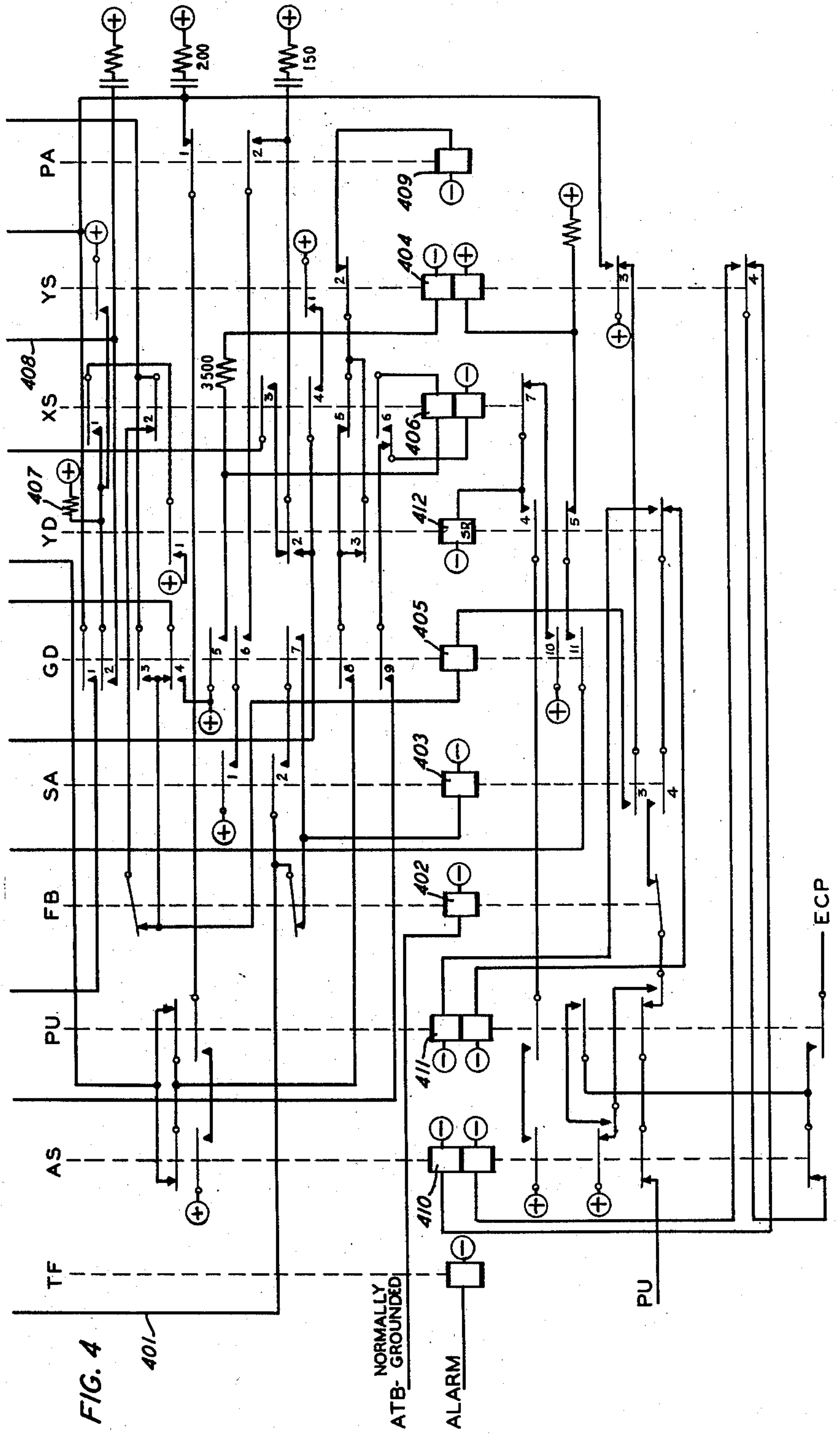
Fig. 4 is a schematic circuit diagram of the allotter circuit which is used to hold an idle line finder such as that of Fig. 3 ready for service.

The operation of the GD relay 405 in the allotter results in the operation of the ST relay 304 in the line finder, Fig. 3 and the SX relay 501, the RD relay 502 and the XD relay 503 in the switch at the far end of the trunk consisting of the T and R conductors 305 and 306.

It may be noted that the ST relay 304 and the SX relay 307 at the central office end of this trunk and the SX relay 501 and the LP relay 504 at the answering service bureau constitute a differential duplex circuit, the distant SX relay 501 responding to the movement of the armatures of the ST relay 304 and the local SX relay 307 responding to the movement of the armatures of the distant LP relay 504.

Thus, when the GD relay 405 in the allotter is operated, a circuit is established from ground, resistor 407, an armature and front contact of the GD relay 405, the ST wire 408, the wiper 308 of the allotter switch, the particular start wire 309 to which the allotter wire 408 is now assumed to be connected, the winding of the ST relay 304, the upper winding of the YT relay 310 to battery. The ST relay 301 will respond but due to the resistance 407 the current in this circuit is insufficient to operate the marginal YT relay 310. The armature 8 of the ST relay 304 closes a charging circuit for the condenser 311 whereby at a later period when the YT relay 310 is operated by a direct ground placed on the ST wire 408, the charge on this condenser may be dissiptaed through the lower winding of the YT relay to render it slow to release to permit the XD relay 503 at the distant end to release, as will be more fully described hereinafter. The operation of the ST relay 304, now changes a ground connection to the conductor 312 to a battery connection for the purpose of operating the distant SX relay 501. The ground connection may be traced from ground, the back contact and armature 7 of the ST relay 304, the back contact and armature 3 of the SW relay 313 to the conductor 312. When the ST relay 304 is operated then the conductor 312 is connected by the armature 7 to its front contact, which may now be traced through the armature and back contact of the PL relay 314, the front contact and armature 4 of the ST relay 304 to battery. The transfer of conductor 312 from ground to battery does not affect the SX relay 307 but does cause the operation of the distant SX relay 501.

The operation of the SX relay 501 results in a direct operation of the RD relay 501 and through the normally closed contacts of the XON switch, the lower winding of the XD relay 503.

Now it may be noted that the conductor 505 is normally connected through an armature and back contact of the LP relay 504, and an armature and back contact of the RD relay 502 to ground. However, this circuit is now transferred through the front contact of the RD relay 502 and the front contact and armature of the XD relay 503 to battery whereby the SX relay 307 is operated.

The operation of the SX relay 307 results in the operation of the PA relay 409 in the allotter circuit. This circuit may be traced from ground, the busy key 315, the armature 8 and back contact of the switch through SW relay 313, the armature 6 and front contact of the ST relay 304, normally closed contacts 316 of the overflow switch, armature 1 and back contact of the YT relay 310, the armature 3 and (now closed) front contact of the SX relay 307, winding of the PL relay 314, the PA conductor and PA wiper of the allotter switch, thence through a back contact and armature of both the AS relay 410 and the PU relay 411 (or either of them) the front contact and armature 8 of the GD relay 405, thence through a back contact and armature of both the YD relay 412 and the XS relay 406 (or either of them) the armature and back contact of the YS relay 404 to the winding of the PA relay 409 to battery. Both the PA relay 409 in the allotter circuit and the PL relay 314 in the line finder circuit operate in this circuit and the PL relay by its armature 1 changes the conductor from battery back to ground whereby the distant SX relay 501 is released.

Now it may be noted that the X magnet 317 and its interrupter springs are operated. This may be traced as follows. Upon the operation of the GD relay in the allotter circuit, a ground is extended through armature 10 and front contact thereof, a back contact and armature 7 of the XS relay 406 to the winding of the YD relay 412 which relay operating provides the circuit for the X magnet 317 of the line finder. This extends from ground, armature 1 and front contact of the SA relay 403 (which originally responded to the BST ground), the armature 6 and front contact of the GD relay 405, the armature 2 and front contact of the PA relay 409, armature 2 and front contact of the YD relay 412, the X conductor, the X allotter switch brush, the front contact and armature 3 of the ST relay 304, normally closed YON contacts, armature 2 and front contact of the ST relay 304 to the winding of the X magnet to battery, thus causing the X magnet to advance the switch one step in the X direction.

At the distant end of the trunk the release of the SX relay 501 now establishes a circuit from ground, the armature and back contact of the SX relay, the armature 4 and front contact of the slow releasing RD relay 502, back contact and armature 2 of the SW relay 506, and the winding of the LP relay 504 to battery. The LP relay operates and through its armature 3 and front contact extends ground through the armature and front contact of the slow releasing XD relay 503 to both the upper winding of this relay and to the winding of the X magnet 507. The X magnet and its interrupter contacts 508 operate and this switch is driven one step forward in its X direction.

As a result of the operation of the LP relay 504, the armature 4 thereof changes the battery connection on conductor 505 to a ground connection at the back contact and armature 3 of the SW relay 506 whereby the SX relay 307 is released.

The release of the PL relay 314 again places battery on the conductor 312 whereby the SX relay 501 is again operated. This allows the release of the LP relay 504 and the consequent release of the X magnet 507.

Upon the release of the LP relay 504, the connection to the conductor 505 is changed back to battery through the front contact of the RD relay 502, which has held operated over the release of the SX relay 501, whereby the distant SX relay 307 is again operated.

In the manner hereinbefore described the PA relay 409 in the allotter circuit and the PL relay in the line finder circuit are again operated whereupon the SX relay 501 is released. The X magnet 317 and its interrupter contacts 318 are again operated and the distance LP relay 504 is again operated by the release of the SX relay 501. The line finder makes a second step in the X direction and in accordance with the above noted assumption a ground will be encountered by the XX brush whereby the XS relay 406 will operate through its lower winding and then lock through both windings in series to the ground on armature 5 of the GD relay 405, thus maintaining this condition as long as the GD relay remains operated. At the distant end the reoperation of the LP relay 504 causes the reoperation of the X magnet 507 whereby this switch, following the line finder, takes a second step in the X direction.

Within the allotter and the line finder, the operation of the XS relay 406 causes the extension of a direct ground (the resistor 407 is now short circuited) to the ST relay 304 and the YT relay 310 whereby the YT relay 310 now becomes operated.

The operation of the XS relay 406 is followed by the release of the YD relay 412 whereby the current through the YT relay is reduced to allow this relay to release, the period of operation of the YT relay being measured, first by the slow releasing characteristics of the YD relay 412 and by the discharging of the condenser 311. This slows release of the YT relay.

It may also be noted that during the interval after which the XS relay 406 becomes operated and before the YD relay 412 becomes fully released, the circuit for the PA relay 409 and the PL relay 314 is opened, whereby the SX relay 501 is reoperated, and the LP relay 504 is released to release the X magnet 507 and to close its interrupter contacts 508.

Figure 5:
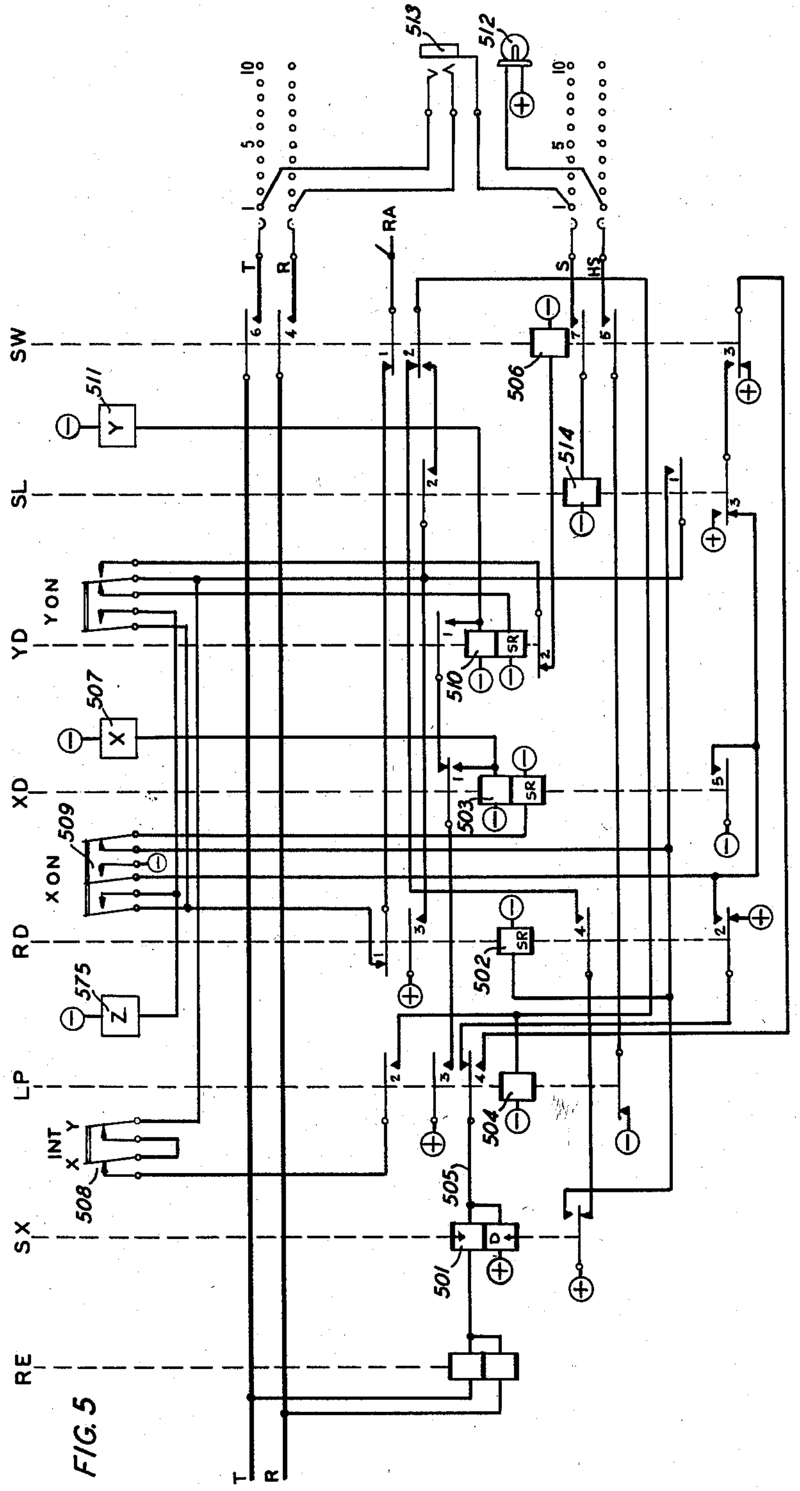
Fig. 5 is a schematic circuit diagram of the switch circuit paired with the line finder of Fig. 3 used to extend the calling line picked up by the line finder to its individual answering service bureau termination.

The slow release of the YT relay 310 holds the circuit for the PA relay 409 and the PL relay 314 open for an additional period thus maintaining the operation of the distant SX relay 501 so that the thus prolonged release of the LP relay 504 will permit the release of the slow release XD relay 503 whereby the stepping of the switch of Fig. 5 in its primary or X direction is terminated.

Upon the release of the LP relay 504, and while the XD relay 503 is still operated and thereafter due to the operation of the XON contacts 509, the conductor 505 will be reconnected to battery so that the SX relay 307 is operated but the delayed release of the YT relay holds up the reoperation of the PA and PL relays. However, after the timing period in which the XD relay 503 is released, the YT relay will release, whereupon the PA and PL relays will again operate.

Upon this operation, a circuit will be established for the Y magnet 319, from ground, armature 1 and front contact of the SA relay 403, armature 6 and front contact of the GD relay 405, armature 2 and front contact of the PA relay 409, armature 2 and back contact of the YD relay 412, front contact and armature 2 of the XS relay 406, the Y conductor and brush of the allotter switch, the Y magnet 319 to battery. The Y magnet steps the switch one step in the Y direction. The line finder sleeve wiper 320 now encounters a battery connection in accordance with the assumption that line 21 is calling, and this extending to the lower winding of the YS relay will cause its operation as will be presently explained.

Also, upon the operation of the PA relay 409 and the PL relay 314 to cause the operation of the Y magnet 319, the conductor 312 is changed from battery to ground whereby the distant SX relay 501 is caused to release whereby the LP relay 504 is operated and now, since the XD relay 503 is not operated and the YD relay 510 is operated through its lower winding and its YON contacts a ground connection will be extended through the armature and front contact of the YD relay 510 to the winding of the Y magnet 511, whereby this switch also makes a step in the Y direction. The switch having operated its YON contacts, the YD relay will remain operated only as long as Y magnet operating pulses are transmitted by the operation of the LP relay 504. However, since it is assumed that only a single step is taken in the Y direction it will be noted that after this single step by the line finder of Fig. 3, the YS relay 404 in the allotter is operated and this opens the circuit of the PA relay 409 and the PL relay 314 and the latter in releasing causes the reoperation of the SX relay 501 and the consequent release of the LP relay 504. As this will now be prolonged, the YD relay 510 will release and the SW relay 506 will be operated.

Upon the release of the PA relay 409 and the PL relay 314, as above mentioned, through the operation of the YS relay 404, it will also be noted that through its armature 5 and front contact this relay again places a direct ground on the conductor 309 to again operate the marginal YT relay 310 for the purpose of preparing a circuit for the distant SX relay 501. The SX relay 501 operates and allows the LP relay 504 to release so that after a period measured by the slow releasing characteristics of the YD relay 510 it releases as above mentioned. Upon the release of this LP relay 504 the wire 505 is connected to battery on the now operated XON springs and the SW relay 307 responds.

In the line finder switch, the operation of the YS relay 404 completes a circuit from ground, armature and front contact of the YS relay 404, front contact and armature 4 of the XS relay 406, the X wire, the front contact and armature 3 of the ST relay 304, the now operated YON and XON and the OF contacts to the switch through SW relay 313. This relay operates and connects the winding of the SR relay 321 first through the front contact and armature 1 of the ST relay 304 and upon operation through its own front contact and armature, armature 4 and front contact of the SW relay 313 to the sleeve brush 320 now connected to a battery connected relay winding in the special line circuit. This constitutes the finding of the line having the unanswered call thereon, and this operation will dismiss the allotter.

At the distant end the SW relay 506 operates upon the release of the YD relay 510 since the YON contacts are now operated. The lamp 512 lights in a circuit including an armature and back contact of the LP relay 504.

In the line finder and allotter the operation of the cut off relay in the special line circuit through the connection with the winding of the SR relay 321, removes the ground to the BST lead, whereby the SA relay 403 and the GD relay 405 are released. Upon the operation of the YS relay 404 the RX magnet 302 is operated but this does not move the brushes, such as 308, until it is released. Therefore it will appear that the release of the GD relay will release the YS relay and the allotter switch will move on. The circuit for the ST relay 304 is first opened by the release of the GD relay 405 and thereafter maintained permanently opened by the disconnection of the allotter from this particular line finder. At this time the SW relay 313, the SR relay 321 and the SX relay 307 are operated in the line finder and the SX relay 501, the RD relay 502 and the SW relay 506 at the distant end are operated and the lamp 512 is aglow. This condition will be maintained indefinitely until an attendant at the answering bureau plugs into the jack 513.

When an operator answers this waiting call the sleeve circuit of the jack 513 becomes operative and the SL relay 514 is operated. The LP relay 504 operates from a ground supplied by the RD relay and the wire 505 is changed to ground whereby the distant SX relay 307 is released. This will result in bridging the AB relay 321 across the tip and ring of the calling line to trip the ringing thereon and supply a bridge for signaling purposes. The operation of the AB relay 322 causes the operation of the AB–1 relay 323, which extends the line over the T and R conductors 305 and 306 to the tip and ring of the jack 513 so that the operator may answer the call. In the line finder the SW relay 313, the SR relay 321, the AB relay 322 and the AB–1 relay 323 are operated and at the answering bureau the SX relay 501, the RD relay 502, the LP relay 504, the SW relay 506 and the SL relay 514 are operated.

*Disconnection—operator disconnects first*

At the end of the conversation between the person making the call to the line of an absent subscriber and the operator at the answering service bureau, it will be assumed that the operator disconnects first by removing the plug from the jack 513. This opens the circuit of the sleeve SL relay 514 and this relay releases. Armature 3 of this relay now transfers from ground on its front contact to the XON battery on its back contact, whereby the distant SX relay 307 is operated, opening at its armature 2 the holding circuit for the SW relay 313. The switch through relay, releasing, opens the circuits for the AB relay 322, its slave the AB–1 relay 323, and the SR relay 307. Upon the release of the SW relay 313, the conductor 312 is transferred from battery to ground at armature 7 and back contact of the ST relay 304 whereby the distant SX relay 501 releases. In the line finder a circuit is now established from the RA ground, through armature 5 and back contact of the ST relay 304, the armature 6 and back contact of the SW relay 313, through contacts in both the YON and the XON switch to the winding of the Z release magnet 325 whereby this switch restores to normal.

At the answering bureau, the release of the SX relay 501 opens the circuit of the RD relay 502, and after a period measured by the slow releasing characteristics of this relay it releases. The LP relay 504 and the SW relay 506 both depending on the ground on armature 3 of the RD relay 502, now release. Thereupon the RA ground is extended over armature 1 and back contact of the RD relay 502 thence through contacts in the XON and YON switches to the winding of the Z release magnet 515 to battery whereby this switch restores to normal. Finally, the wire 505 is switched to ground at armature 2 and back contact of the RD relay 502 whereby the distant SX relay 307 is released. The link terminating in the line finder of Fig. 3 and the switch of Fig. 5 is now restored completely to normal and the line finder may again be allotted for service. It may be noted that while the subscriber who has made the call to the line circuit terminating in the bank terminals of the line finder, may tie up the special line circuit, he cannot hold the link out of service after the answering bureau operator has disconnected.

*Disconnection—calling party disconnects first*

Where the calling party disconnects first, the ground on the sleeve brush 320 is removed and the SR relay 321 restores. The AB relay 322 and its slave the AB–1 relay 323 release because the battery supply for the AB relay is removed in the special line circuit. Through the release of the SR relay 321 the conductor 312 is switched to ground at the back contact of armature 2 of the YT relay 310 whereby the distant SX relay 501 is released. No further operations now take place until the operator disconnects since the RD relay 502 is locked by the SL relay 514. Thus the operator may hold the link out of service at will.

When the operator does remove the plug from the jack 513, she releases the SL relay 514, whereupon the wire 505 is switched to battery in the XON switch during the slow releasing period of the RD relay 502 so that the distant SX relay 307 temporarily operates to open the holding circuit of the SW relay 313 to thus restore the line finder as before.

At the answering bureau the release of the SL relay 514 is shortly followed by the release of the RD relay 502 which thereupon opens the holding ground at its armature 3 and the SW relay 506 and the LP relay 504 release whereupon the switch restores as before.

What is claimed is:

1. In a telephone system, a plurality of telephone lines each being equipped with central office circuitry provided for subscribers to a telephone answering service, said circuitry including a central office line finder termination and a distant answering bureau termination individual to each said line, said terminations being normally separated, a line finder having said central office terminations appearing in the bank terminals thereof and a similar distantly located switch having answering bureau terminations appearing in the bank terminals thereof, a communication channel between said line finder and said switch, said line finder and said switch being in a mutually controlled circuit for causing said switches to operate step-by-step in exact one to one correspondence each with the other to successively interconnect each said line and its answering bureau termination.

2. In a telephone system, a plurality of telephone lines each having a line circuit for handling incoming and outgoing calls and each having an additional line circuit for handling unanswered incoming calls, a plurality of line finders for making connections to said lines, an allotter for enabling said line finders in sequence, means in each said additional line circuit for alerting said allotter and for marking a line having an unanswered call as a calling line in the banks of said line finders, a corresponding plurality of distant switches each individual to one of said line finders and a communication channel between each said switch and its corresponding line finder, said distant switches having answering bureau terminations in the bank terminals thereof in one to one correspondence with said lines appearing in the bank terminals of said line finders and a mutually controlled circuit for each said line finder and its corresponding distant switch for driving said switches concurrently over said lines and the corresponding answering bureau terminations thereof.

3. In a telephone system, a plurality of telephone lines each having a line circuit for handling incoming and outgoing calls and each having an additional line circuit for handling unanswered incoming calls, each said line having an individual line termination in an answering bureau, each of said terminations being normally disconnected from its said line, switching means for extending each said line to its said individual answering bureau termination, said switching means being responsive only to an incoming call to a said line unanswered after a predetermined period, whereby an operator at said answering bureau may gain access to a said line only under said predetermined condition.

4. In a telephone system, a plurality of telephone lines each having a line circuit for handling incoming and outgoing calls and each having an additional line circuit for handling unanswered incoming calls, each said line having an individual line termination in an answering bureau, each of said terminations being normally disconnected from its said line, switching means for extending each said line to its said individual answering bureau termination, each said additional line circuit having timing means responsive to the application of ringing current to the said associated line for delaying the enablement of said switching means, said switching means being responsive only to an incoming call to a said line unanswered after a predetermined period measured by said timing means, said switching means comprising a pair of switches in a control circuit so constructed and arranged for each switch to advance step-by-step and each switch depending for advancement another step on the completion of an advancement by a step by the other said switch.

5. In a telephone system, a plurality of telephone lines each having a line circuit for handling incoming and outgoing calls and each having an additional line circuit for handling unanswered incoming calls, each said line having an individual line termination in an answering bureau, each of said terminations being normally disconnected from its said line, switching means for extending each said line to its said individual answering bureau termination, each said additional line circuit having timing means responsive to the application of ringing current to the said associated line for delaying the enablement of said switching means, said switching means being responsive only to an incoming call to a said line unanswered after a predetermined period measured by said timing means, said switching means comprising a pair of switches in a control circuit worked over a differential duplex circuit therebetween for mutual control whereby each switch depends for advancing another step on the completion of a step by the other said switch.

References Cited in the file of this patent

UNITED STATES PATENTS

| | | |
|---|---|---|
| 2,258,853 | Jauch | Oct. 14, 1941 |
| 2,358,017 | Lomas | Sept. 12, 1946 |
| 2,542,079 | Grundin et al. | Feb. 20, 1951 |
| 2,715,658 | Dunlap et al. | Aug. 16, 1955 |
| 2,783,306 | Lesigne | Feb. 26, 1957 |
| 2,787,667 | Mauge et al. | Apr. 2, 1957 |